(12) United States Patent
Holder et al.

(10) Patent No.: US 7,427,167 B2
(45) Date of Patent: Sep. 23, 2008

(54) APPARATUS AND METHOD OF USING LED LIGHT SOURCES TO GENERATE A UNITIZED BEAM

(75) Inventors: Ronald G. Holder, Laguna Niguel, CA (US); Greg Rhoads, Irvine, CA (US); Joel Widom, Laguna Beach, CA (US)

(73) Assignee: Illumination Management Solutions Inc.

( * ) Notice: Subject to any disclaimer, the term of this patent is extended or adjusted under 35 U.S.C. 154(b) by 31 days.

(21) Appl. No.: 11/228,164

(22) Filed: Sep. 15, 2005

(65) Prior Publication Data

US 2006/0061989 A1    Mar. 23, 2006

Related U.S. Application Data

(60) Provisional application No. 60/670,490, filed on Apr. 11, 2005, provisional application No. 60/611,052, filed on Sep. 16, 2004.

(51) Int. Cl.
*G02B 6/36* (2006.01)
*F21V 11/00* (2006.01)
*F21V 7/00* (2006.01)
*F21V 7/04* (2006.01)

(52) U.S. Cl. ............... 385/92; 362/240; 362/241; 362/346; 362/555; 362/560; 385/88

(58) Field of Classification Search ............... 84/464 R; 385/88, 92–94; 362/230, 231, 234–236, 362/240, 241, 341, 346, 555, 560
See application file for complete search history.

(56) References Cited

U.S. PATENT DOCUMENTS

| 4,378,143 | A  | * | 3/1983 | Winzer ................. 385/44 |
| 6,554,463 | B2 | * | 4/2003 | Hooker et al. ........... 362/555 |
| 6,730,019 | B2 | * | 5/2004 | Irion .................. 600/178 |
| 6,765,496 | B2 | * | 7/2004 | Dayan ................. 340/903 |
| 7,048,385 | B2 | * | 5/2006 | Beeson et al. ........... 353/97 |
| 7,083,304 | B2 | * | 8/2006 | Rhoads et al. .......... 362/293 |
| 7,153,015 | B2 | * | 12/2006 | Brukilacchio ............ 362/555 |
| 7,286,296 | B2 | * | 10/2007 | Chaves et al. ........... 359/641 |
| 2004/0090794 | A1 | * | 5/2004 | Ollett et al. ............ 362/555 |
| 2005/0231974 | A1 | * | 10/2005 | Ruffin ................ 362/555 |

* cited by examiner

*Primary Examiner*—Kevin S Wood
*Assistant Examiner*—John M Bedtelyon
(74) *Attorney, Agent, or Firm*—Daniel L. Dawes

(57) ABSTRACT

An apparatus includes: a plurality of light emitting diodes (LED) of similar or differing wavelengths; a reflector for collecting energy from two or more LEDs into an approximately composite beam; and a housing for distributing this energy into a common aperture. A heat sink and electronic control for the individual LEDs is included. The LEDs have different color outputs and are selectively controlled to determine the color of light from the apparatus. In one embodiment there are at least two LEDs, at least two reflector cavities, a common combining cavity or zone, a mounting each of the LEDs within the reflector cavities and a housing. The LEDs are mounted on the heat sink And selectively driven to modulate the intensity of selected ones of the LEDs according the nature of the frequency bands in the driving signal, e.g. mixed color outputs according to the control of a musical signal.

2 Claims, 3 Drawing Sheets

APPARATUS AND METHOD OF USING LED LIGHT SOURCES TO GENERATE A UNITIZED BEAM

RELATED APPLICATIONS

The present application is related to U.S. Provisional Patent Application, Ser. No. 60/670,490, filed on Apr. 11, 2005, and U.S. Provisional Patent Application, Ser. No. 60/611,052, filed on Sep. 16, 2004, which are incorporated herein by reference and to which priority is claimed pursuant to 35 USC 119.

BACKGROUND OF THE INVENTION

1. Field of the Invention

The invention relates to the field of apparatus and method for using light emitting diodes (LED) or other light sources of similar or differing wavelengths in an approximately unitized beam. The device would be generally described as being in the field of fiber illumination, but could be used in non-fiber devices in the general lighting field as well.

2. Description of the Prior Art

The initial investment cost of LED illumination is very expensive when compared with traditional lighting means using cost per lumen as the metric. While this may change over time, this high cost places a premium on collection and distribution efficiency of the LED optical system. The more efficient the system, the better the cost/benefit comparison with traditional illumination means, such as incandescent, fluorescent and neon.

A popular type of illumination device is the fiber illuminator. Typically these devices comprise an illumination source, a reflector and/or lens and a means to attach the optical fiber in place. Illumination sources used in these devices range from incandescent (Halogen, etc.) to HID (High-Intensity-Discharge arc lamps). The LED is relatively new to these devices, but holds several advantages. The light energy of the LED is primarily in the visible spectrum and contains little or no UV or IR. Therefore LEDs do not cause deterioration of the fiber as do the traditional means. LEDs also provide color(s) at a very improved efficiency.

However, the optical performance of conventional Fiber Devices, with or without LEDs, is often less than satisfactory. For example, For an HID lamp to provide red output requires filtering of all the other colors in the beam spectrum. This can result in over 50% efficiency loss. Prior art techniques in LED technology suffer a different problem, however. Most LED fiber-illumination devices use one of three basic techniques. Butt-joining the LED to the fiber, imaging the LED emitter onto the fiber end with a ball or other lens and elliptical reflectors. An LED is a Lambertian emitter. Therefore, in the first example, only the energy of the LED that is within the numerical aperture (N/A) of the fiber is accepted, the rest is rejected as loss to the device. In the second example only the energy from the LED that falls within the N/A of the lens system is accepted. In a reflector based system, only a single LED can be collected at high efficiency, so the device is limited in scope.

Another class of prior art includes the ability to change color by placing a color wheel in way of the beam before it enters the fiber. Typically, these dichroic color wheels are manufactured of glass to handle the high temperature of the light source.

Another form of color illuminator combines red, green, blue and possibly other colored light sources, either LED or not, in order to increase brightness in a complex dichroic mirrored optical path to combine the resultant light. Again the optical path ways are long, the optical system is necessarily physically large and the overall performance is still subject to intensity and collimation losses.

What is needed is a some kind of a controllable combined light source which is not subject to the inherent disadvantages of such prior art.

BRIEF SUMMARY OF THE INVENTION

The invention pertains to the use of light emitting diodes (LED) in a device that combines the energy from multiple LEDs of similar or differing wavelengths into an approximate unitized beam. In the illustrated embodiment "unitized beam" means that the rays from the multiple LEDs are combined across a single aperture with substantially identical light or energy distributions across the single aperture. In the illustrated embodiment the directions of the rays from each of the multiple LEDs at the aperture are different so that at a distance beyond the aperture, the ray sets will again separate and show as multiple light beams. In addition, it must be understood that although the light from the multiple LEDs are provided without qualitative differences across the aperture, i.e. they have substantially identical light or energy distributions across the single aperture, it is entirely within the scope of the invention that the each LED can be differently or independently modulated in frequency or intensity. As will be seen below, the light from three LED's is projected onto the common aperture each at a different angle in space, but at the same angle of declination. Therefore the plane of the common aperture will be inclined with respect to the wavefront from each LED beam and it is not to be expected that the energy distribution across the common aperture is symmetric or uniform with respect to any given LED beam. However, in the illustrated embodiment each LED is situated in approximately the same optical relationship with respect to the common aperture as are the other LEDs. This is not however to preclude the possibility that the optical relationship of each LED or a parameter of the LED beam might be qualitatively different from that of the other LEDs as measured at the common aperture.

The invention provides for the efficient collection of energy radiating from two or more LEDs, and then distributes this energy into a common aperture. The invention further includes thermal management of the device and contemplates electronic control of the individual LEDs.

By choosing different color outputs for the LEDs and since the LEDs are individually controllable, the device of the invention may be used generally in a wide variety of applications as a generic source of selectively controllable colored light. In fact, if three LEDs are chosen, each with a primary color, almost any color of the visible spectrum can be provided across the aperture. It is also contemplated that light both in the ultraviolet and infrared could be similarly utilized in such applications where needed.

One embodiment of the invention is a highly efficient LED based device with an energy source, at least two LEDs, at least two reflector cavities, a common combining cavity or zone, a means for mounting each of the LEDs within the reflector cavities and a housing. The LEDs are mounted on a heat conductive material that provides the thermal management for the LEDs.

The reflector cavities are optimized for collection of the nearly hemispheric radiation pattern of the LED. They are designed in such a way as to provide a beam that is approximately equal to the acceptance angle, or within the numerical aperture (N/A) of the fiber.

"Numerical aperture (NA)" is defined as the sine of the vertex angle of the largest cone of meridional rays that can enter or leave an optical system or element, such as an optic fiber, multiplied by the refractive index of the medium in which the vertex of the cone is located. The NA is generally measured with respect to an object or image point and will vary as that point is moved. For an optical fiber in which the refractive index decreases monotonically from $n_1$ on the axis to $n_2$ in the cladding, an expression of the extent of the fiber's ability to accept, in its bound modes, non-normal incident rays, is given by $NA=(n_1^2-n_2^2)^{1/2}$. In multimode fibers, the term equilibrium numerical aperture is sometimes used. This refers to the numerical aperture with respect to the extreme exit angle of a ray emerging from a fiber in which equilibrium mode distribution has been established. More colloquially, NA is defined as the sine of the radiation or acceptance angle of an optical fiber, multiplied by the refractive index of the material in contact with the exit or entrance face. This usage is approximate and imprecise, but is often encountered.

The more relevant physical concept in the illustrated embodiment is "acceptance angle", which is defined in fiber optics as half the vertex angle of that cone within which optical power may be coupled into bound modes of an optical fiber. The axis of the cone is collinear with the fiber axis, the vertex of the cone is on the fiber end-face, and the base of the cone faces the optical power source. The acceptance angle is measured with respect to the fiber axis. Rays entering an optical fiber at angles greater than the acceptance angle are coupled into unbound modes.

The reflector cavity may have a common conic shape or not and may be faceted or dimpled or otherwise modified to provide a desired beam pattern. Any configuration or form of optical reflector now known or later devised can be equivalently employed, such as an internally reflective coated cavity reflector or a solid molded optic with or without coating, commonly referred to as a 'TIR' (Total Internal Reflection) optic. The centerline of the reflector cavity is rotated off axis from the perpendicular of a shared aperture at approximately one-half of the acceptance angle of the fiber. The reflector cavity is connected by a near cylindrical reflective cavity to the shared aperture. This cavity, or zone, can be the Boolean intersection of the reflectors or the Boolean of an extension of each of the reflectors to a common aperture.

In a two LED system, two cavities would be rotated opposite the centerline and the near cylindrical zones would be truncated to allow the energy of each reflector cavity to find the aperture. This near cylindrical zone, or when joined in a "combining cavity", keeps the energy of each beam within the N/A of the fiber with the exception of a very small portion on the opposite side of the system centerline from the reflector cavity.

Additionally the invention is an apparatus for generating a selected color of light comprising a plurality of light sources disposed in a housing, each radiating a color of light and a corresponding plurality of reflectors disposed in the housing. Each reflector is paired with a light source to reflect light from one of the plurality of light sources. The light sources and reflectors are arranged and configured to combine reflected light from the reflectors into a composite light beam from the plurality of light sources. The arrangement in the illustrated embodiment is comprised of three light sources, each disposed 120 degrees about the system centerline.

The plurality of light sources generate a nearly full color spectrum of visible light, or more specifically green, blue and red light in selected amounts. The apparatus further comprising means for individually controlling the intensity of light from each of the light sources, such as conventional drive circuits coupled to the light sources. Other color primaries or bases, other than green, blue and red, may be substituted according to the application and effect desired to increase, decrease or change the number and type of color primaries or bases used for combining or composition, such as amber or yellow added as a fourth primary or base color to provide a larger spectrum of combined colored light. Each unit can be comprised of multiple light sources of the same color spectrum for higher intensity.

The invention also includes a method of providing and operating the apparatus described above.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The components shown in the diagrams are the essential optical and elemental components to understand the invention. Omitted from the diagrams may be some electrical wires, housings, circuit boards, fasteners and other components that may be required, but are not essential to the understanding of the device.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
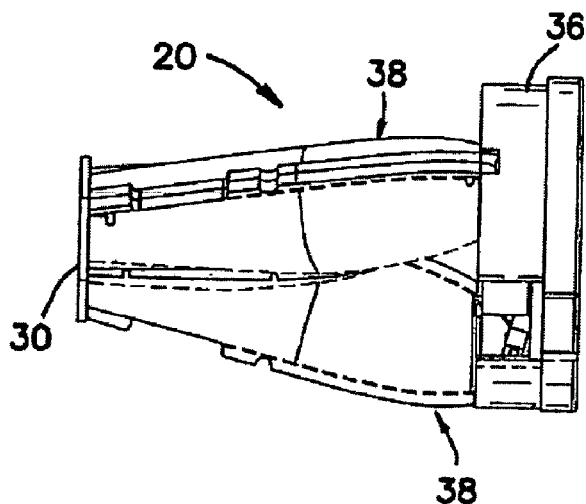
FIG. 1 is a side view of one embodiment of the invention in which three LEDs are used and shown in phantom outline in a housing.
Figure 2:
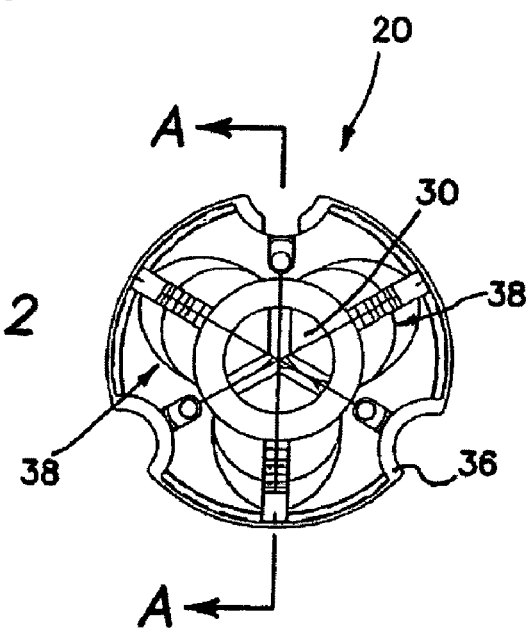
FIG. 2 is an end plan view of the embodiment of FIG. 1.
Figure 3:
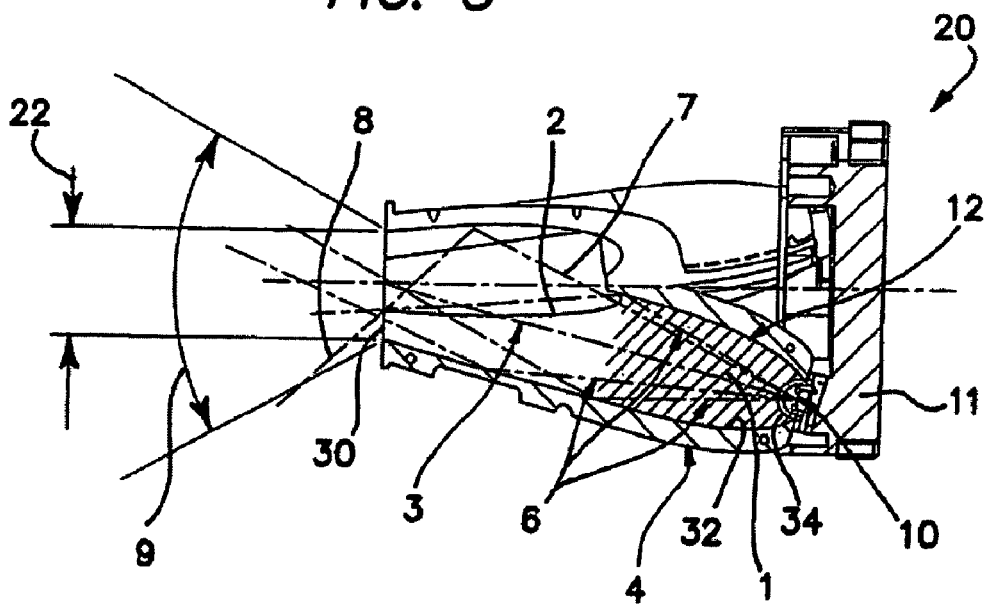
FIG. 3 is a side cross-sectional view of the embodiment of FIG. 1 as seen through section lines A-A of FIG. 2.

Turn to FIGS. 1-3 wherein the illustrated embodiment of the optical portion of the invention is depicted. FIG. 1 is a side elevational view of the assembled device, generally denoted by reference numeral 20, which is comprised of an assembly of various optical elements described below. In the illustrated embodiment device 20 is comprised of a common base 36 into which three lighting elements 38 are mounted. Base 36 includes a mounting platform for LEDs 10, a thermal heat sink 11, related electrical connections (not shown) to LEDs 10 and a conventional mechanical means of affixation for device 20. The three lighting elements 38 are better shown apart from base 36 in FIG. 4 where one of the three lighting elements 38 is illustrated in exploded disassembled view from the other two lighting elements 38. In the preferred embodiment each lighting element 38 is comprised of two molded halves 38a and 38b, which snap fit together or may be adhered to each other and aligned through conventional pins 40 and holes 42 defined in mating portions of lighting elements 38.

LED 10 is inserted into the cavity of reflector 1 of lighting element 38 through base 34, on the optical axis of reflector 1 and typical at or near the focal point of reflector 1. Surface 32 as described below is arranged and configured to provide a reflective surface and defines an aperture 44 of reflector 1 which is internal to lighting element 38. Beyond aperture 44 along the optical axis of reflector 1 lies combining chamber 2 in which the directed beam from reflector 1 for each of the three lighting elements 38 are combined to provide a unitized beam at aperture 30 of device 20.

In the illustrated embodiment each of the three lighting elements 38 are azimuthally equally spaced about aperture 30 of device 20, namely with the respective optical axis of each lighting element 38 at approximately 120° azimuthal angular spacing. In addition, each lighting element 38 has its optical axis inclined from perpendicular to aperture 30, which is also the longitudinal axis of fiber 22, at an angle of approximately 15°±3° declination or less. The acceptance angle of fiber 22 in the preferred embodiment is approximately 30°±6°. Fiber 22 is preferably a 0.5 inch diameter fiber, which approximately matches the diameter of aperture 30, but it is to be understood that the invention contemplates any diameter fiber and scaling device 20 to conform with the acceptance angle of the fiber being used. For example, if a fiber were used which had an acceptance angle of 40°, then the three lighting elements 38 of device 20 could be inclined at an angle of approximately 20° or less. The acceptance angle will be different for each fiber depending on multiple factors, such as the frequency of the light, fiber composition, fiber diameter, fiber cladding fiber shape, fiber structure and other parameters.

Figure 4:
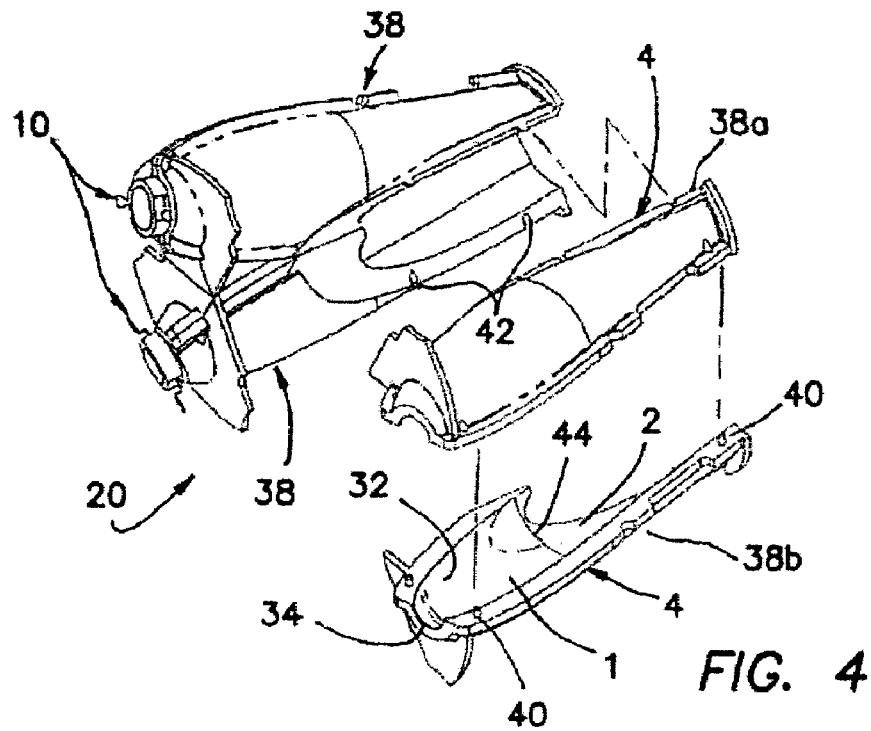
FIG. 4 is a rotated, partial exploded view of the embodiment of FIG. 1 of the main optical components of the system.

Further, the design also lends itself to inexpensive fabrication since the components can be plastic material and there is essentially no alignment required. Pictured in FIGS. 1-4, highlighted in FIG. 4, is a preferred embodiment depicting an advantageous construction means whereby a reflector 1 and reflective combining chamber 2 are made of two molded halves for easy coating of the reflective surfaces 32. These halves are further combined in a unique assembly combining multiple reflector cavities 1 and reflective combining chamber(s) 2. This construction means is described for clarity and is described in the claims, but is not the only means of constructing the invention. For instance, the reflector cavities 1 can be made as separate components and then separately joined to a common reflective combining chamber 2 or the reflector cavities can be a solid molded component with or without an externally applied reflective coating.

Turn now to the optical elements within device 20. One of the optical elements is a reflector 1, whose centerline is disposed in an angled orientation of device 20 as shown in the side cross-sectional view of FIG. 3. The light emitted from the LED 10, represented by a light rays 6 and 7, passes through the aperture 30 of reflector 1, either reflecting off the surface 32 of reflector 1 and/or combining chamber 2, or not. The aperture 30 is sized to insure that essentially or substantially all light emitted by the LED 10 and or reflected off of reflector 1 or reflected off the nearly cylindrical surface of combining cavity 2 is restricted to one-half the acceptance angle 9 of a fiber 22 that may be placed at aperture 30, which in the illustrated embodiment is no more than 15° off the optical axis of fiber 22 or the perpendicular axis of symmetry of aperture 30. The only exception is the light which is represented by ray 7 which reflects off the opposite wall of combining chamber 2 as represented by ray 8. Some of the light which reflects off the opposite wall of combining chamber 2 will be within the acceptance angle of fiber 22. It is estimated that not more than ten percent of the light emitted from aperture 30 will be outside the acceptance angle.

The reflective surface of reflector 1 can be coated to reflect substantially all of the peripheral light from light emitting diode, LED 10, which is held in relative position of reflector 1 by means of a heat sink 11, which is thermally coupled to LED 10. The design, form and function of reflector 1 may include any reflector geometry and technology now known or later devised. In the preferred embodiment, reflector 1 is provided as a "Sally" reflector, which is a proprietary term used defined for the purposes of this specification and its claims an LED reflector as described in copending U.S. Patent Application Publication number 2005/0219840, filed Mar. 31, 2005, which is incorporated herein by reference. The Sally reflector delivers substantially all or at least 90% of the light generated from the light source in the designer controlled composite energy distribution pattern on the surface.

As stated, while any reflector design may be employed, further description of the preferred embodiment of the Sally reflector 1 may be helpful for understanding the best mode of practicing the invention. More specifically, Sally is defined in one embodiment as comprising a light source, LED 10, whose intensity varies as a function of the angles of the light rays radiated from the light source 10 in a three dimensional radiation pattern, and a reflector 1 comprising a reflective surface 32 having a base 34 and aperture 44. The reflector 1 is proximate to the light source 10 and defines a system half angle by its aperture 44, which allows directly radiated energy to propagate from the light source 10 through the aperture 44 of the reflector 1 to provide a directly radiated energy distribution pattern. The reflector 1 has three distinct conic shaped zones, each providing a surface of revolution. The first zone is parabolic, the second zone is a straight conic and the third zone is elliptical, in that order, beginning with the base of the reflector and moving toward its aperture 44. These zones provide a designer controlled reflected energy distribution pattern overlaid onto the directly radiated energy distribution pattern on the surface 32, which reflected energy distribution pattern combines with the directly radiated energy distribution pattern to produce a designer controlled composite energy distribution pattern across aperture 44.

More generally, instead of the three zone system described above Sally comprises a reflector 1 with a defined shape derived from a transfer function, which has as inputs: the three dimensional radiation pattern of the light source 10; beam parameters, such as light source-to-surface distance and beam diameter; system parameters of the reflector 1 such as reflector size and aperture size of the reflector 1; and a desired composite energy distribution across aperture 44. The transfer function has as outputs: an amount of directly radiated energy propagating through the aperture 44 of the reflector 1; a remainder of the total available radiated energy from the light source 10 less the energy of the light directly radiating to aperture 44; and a calculated position and orientation of each point on the reflector 1 as a function of angle needed to provide the desired composite energy distribution across aperture 44, which calculation defines the shape of the reflector 1 necessary to provide a reflected energy pattern to overlay the directly radiated energy pattern to form the designer controlled composite energy distribution across aperture 44.

LED 10 is understood to include a solid state light emitting diode package, which includes a semiconductor substrate in which the light emitting junction is defined, electrical leads, passivation layers and a protective dome mounted on or forming part of the passivating package around the junction and substrate. The illustrated embodiment employs an LED 10, but it is to be understood that any light source may be employed which is now known or later devised, such as incandescent, fluorescent, arc, or gas plasma sources as a few examples. Thus, wherever LED is referred, it is to be understood according to the context that any light source could be equivalently substituted.

It must also be understood that less or more than three LEDs 10 may be combined in device 20 according to the foregoing teachings. Heat sink 11 is typically comprised of metal but any thermally conductive material may be employed.

The aperture 30 may incorporate a lens or lenses or other conventional optical elements that may be optionally provided to spread or converge the combined light beam, asymmetrically or not, or provide diffusion or other optical effects according to conventional design options. Such lenses can also be used to facilitate light coupling into the optic fiber 22.

Reflector 12 as shown by example in FIGS. 1-5 should not be taken as limiting the invention which extends to all types of reflector systems and color systems. For example, while the color system of the illustrated embodiment is red, blue, green, it is also possible to provide a 'Munsel' light comprised of a system of red, blue, green, and amber or yellow with an appropriate four LED-reflector or optical system.

By selecting appropriate colored LEDs 10 and controlling the output of the individual LEDs 10, the device 20 could be used either alone or in combination for several different and distinct purposes. These uses include: a light source for projection systems, a color changing light source for displays, architectural lighting, architectural fiber, theater and stage lighting, a light source for color corrected display systems, stadium lighting, signage, including building and safety enunciators, consumer audiovisual entertainment systems, and many other lighting related applications.

In a preferred embodiment as shown in FIGS. 1-3, the device 20 is shown with three LEDs 10. One of LEDs 10 is red, one is green and one is blue. The light from all three LEDs 10 can then be considered as combined in the same physical space at the aperture 30. By separately adjusting the light output of the individual LEDs 10 by means of any conventional LED drive circuit 28 as shown in FIG. 5 in theory any color of light beam can be produced by the invention.

Figure 5:
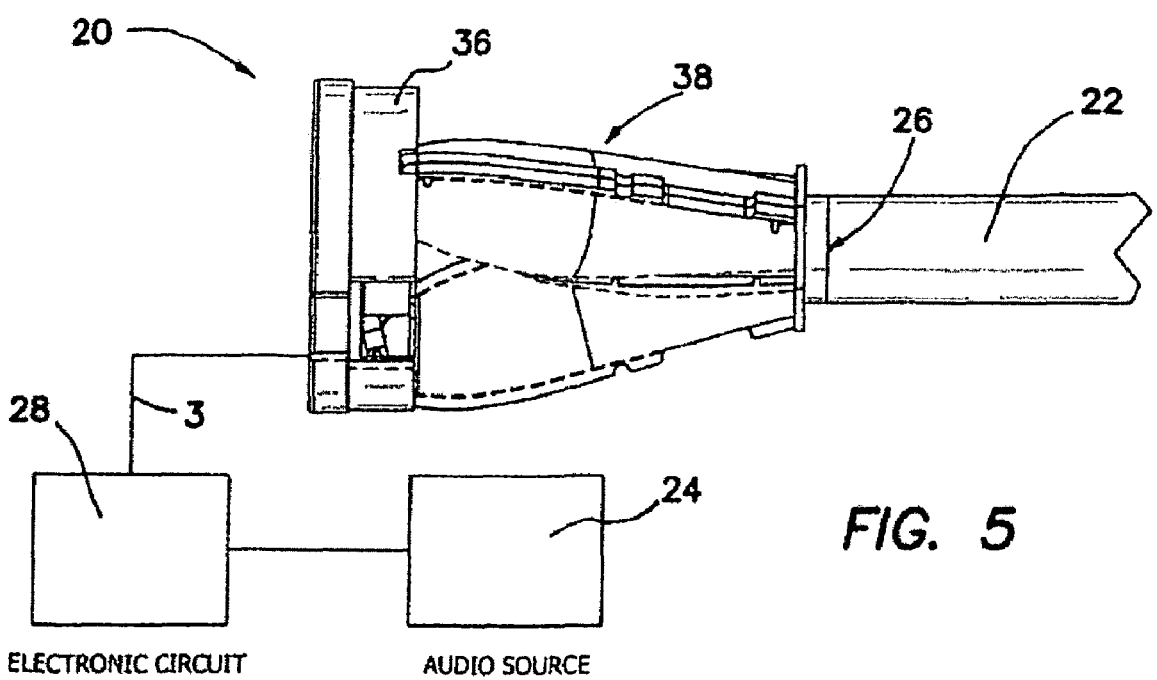
FIG. 5 is a diagrammatic side view of another embodiment where the device of FIGS. 1-4 is combined with an optical element, such as a fiber, and selectively driven by electronics using a musical signal or audio tones as the controlling input.
Figure 6:
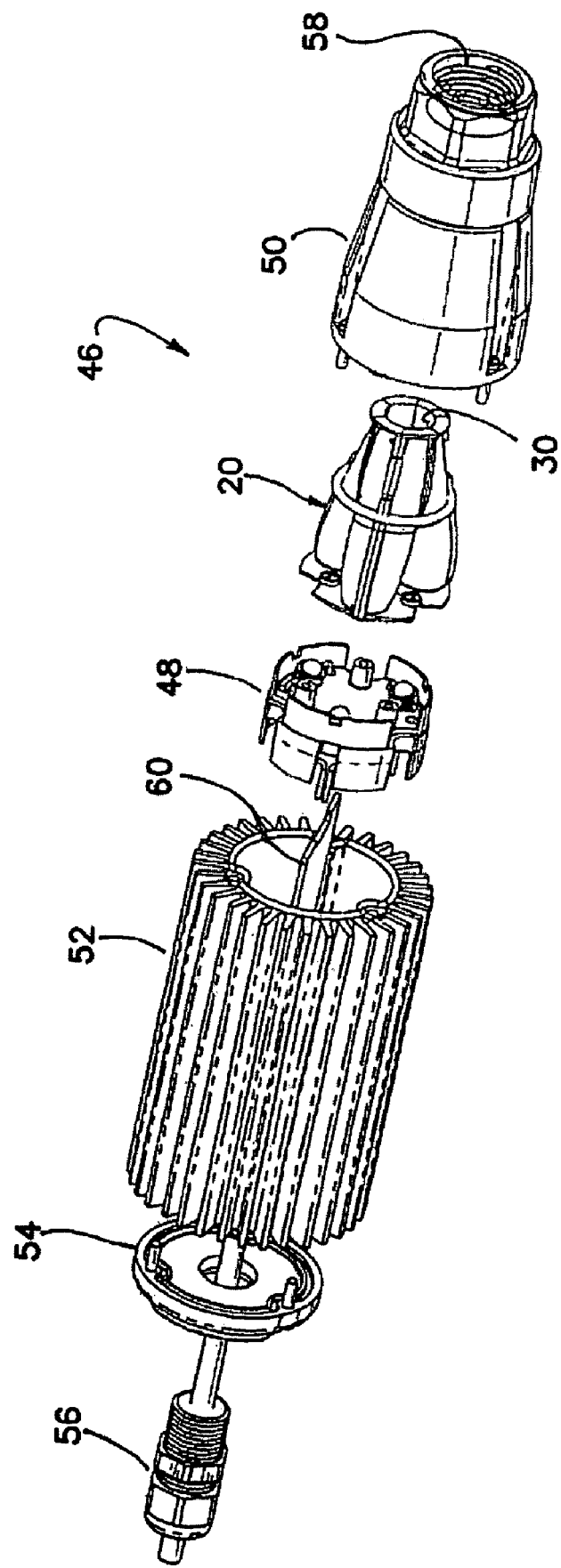
FIG. 6 is an exploded assembly view of a modular fixture into which the embodiment of FIGS. 1-5 may be employed.

Turn now to FIG. 6 in which a fixture, generally denoted by reference numeral 46, is shown in exploded assembly view. Device 20 as described above in FIGS. 1-5 is mounted on a base 48 of fixture 46. A protective nose cone 50 encloses device 20 and is affixed to base 48. Aperture 30 of device 20 is positioned at or a predetermined distance inside aperture 58 of nose cone 50, which can be arranged and configured to attach to fiber 22 or any other optical element of application. Base 48 is also connected to printed circuit board 60 to which any and all necessary electronics, including LED drivers 28 and audio source 24 or other interfacing circuitry is mounted. Printed circuit board 60 is housed within a cylindrical finned heat sink 52 which may be thermally coupled to heat sink 11 within device 20 and/or thermally coupled to printed circuit board 60, which is held in heat sink 52. A closing end cap 54 is connected to the opposing end of heat sink 52 through which an electrical connector 56 is disposed, and which is connected to cap 54. Electrical connector 56 may also provide a means for mechanically mounting fixture 46 to other objects. It is of course to be understood that many other fixture designs could incorporate device 20 or devices made according to the teachings of the invention. The embodiment of FIG. 6 is provided only to show a completed, weather proof, modular unit ready for direct connection to an electrical power source and electrical control if needed.

Hence, it can now be appreciated that the invention provides an electronically controllable colored light source which is physically compact and provides a single, selectively controllable, colored beam of light with a minimum of the number of optical elements and reflective surfaces and a minimum optical path length.

In another embodiment the invention relates to the use of audio or sound to control the combining of multiple colored LED light sources 10 into a fiber 22 or other conduit for light or optical element as shown in FIG. 5. The intensity of individual LEDs 10 controlled by an audio signal and mixed into a fiber 22 creates millions of colors in the fiber 22 and generates an effect that appears to change color in time with the music. Unlike color generators or organs of the prior art, the color in the fiber 22 is mixed, rather than discrete, and so the output color of the device 20 is constantly changing.

A preferred embodiment of the invention is comprised of an audio source 24 coupled to device 20; one or more LEDs 10 of differing wavelength, usually red, green and blue; a means 26 to combine the output of the LEDs 10 into a fiber 22, preferably within the N/A or acceptance angle of the fiber 22; and an electronic circuit 28 that resolves an audio signal from the audio source 24, such as an output from a music system, into discrete wavelength bands equaling the number of LEDs 10 and uses a mathematically derived value of the separated wavelengths or selected portions of the frequency spectrum to selectively drive the LEDs 10. Any mathematically derived measure of the bands of the frequency spectrum may be employed, including without limitation averages, and weightings according to relative peak values. As the audio source computed value varies for each frequency band, the corresponding LED intensity will vary as well. The combining of the output of these LEDs 10 into a fiber 22 generates colors that change according to the audio signal. The means 26 may take the form of a conventional fiber component, such as a compression fitting as manufactured by Heyco, Toms River, New Jersey or equivalent.

This embodiment of the invention can be used for entertainment, discotheques, clubs, bands, DJs, nightclubs, bars, advertising, stage shows and many more uses, too many to enumerate. It could be used to program color changing for fibers 22 using music tools such as MIDI devices and computer software, and/or used for advertising, lettering, signage and many other effects. Depending on the input, the device of FIG. 5 could strobe, roll or blend color using standard musical notation. The invention must be understood to include the embodiment wherein a single LED 10 is turned on and off or modulated with an audio signal.

The electronics 24, 28 of the invention may use analog or digital processing or preprocessing and may use bandpass or other filtering techniques to generate the distinct frequency ranges for processing. The electronics 24, 28 may also provide various attack and decay scenarios to generate unique color blending. The electronics 24, 28 may also provide real time analysis of the signal to generate equalizing or other effects. Digital signal processing (DSP) may be employed to create special effects. In other words, any audio synthesization or sound manipulation now known or later devised can also be applied in the same or modified from to an audio input signal coupled to circuit 24, which will then manipulate or process the input signal to generate a plurality of output signals according to the chosen manipulations or processing.

Further, it must be understood that not only music but any audio or non-audio signal may be used as the driving input or one of the driving inputs of device 20. For example, the audio signal could be voice signals or natural or machine sounds, such a diagnostic or warning sound in the event that a sound signifies the onset or termination of an event of interest. Circuit 24 thus has an input signal corresponding to a voice or machine sound and then interprets the voice or machine sound to generate selective responsive output signals to drive the plurality of LEDs creating a specific color and/or temporally varying light pattern indicative of a corresponding voice or machine sound. Thus, the input sound signal need not be in the audible range, but may extend to both subaudible and superaudible frequencies. Device 20 may not only be controlled according to the intensity or energy content of various bandwidths in the spectrum of the driving signal, but any characteristic desire of the driving signal may be used as the control parameter. For example, amplitude or information content of the signal may be employed in place of or in addition to spectral distribution.

The number of applications are too numerous to mention, but as only one class of examples, the onset of a failure of materials often is heralded by nonaudible sounds. Such sonic signals may have complex characterizations and be analyzed more as complex signatures than by spectral distributions. For example, ultrasonic input signals, which may be vibrations, and which may be precursors of the failure of a structural element or of some aspect of its physical state, such as an operating helicopter rotor blade, can be received, detected and a selected color warning light with a specific repetition pattern generated. For example, if voice recognition were used as the driving signal, electronic 24, 28 could be programmed either to modulate device 20 based on word recognition or even on individual voice quality recognition, much like fingerprint recognition. Further the driving signal or signals need not be sound, but can be any signal or signals imaginable, such as the stalling airspeed of a small aircraft, where the stall speed is a function of multiple driving factors and where the stall condition is gradually entered as these factors increase in degree with the light changing accordingly from green to amber to red in a continuous shift in color.

The invention has been illustrated in the context of a simple three LED device, but the principle of the invention can be extended to a micromachined array of integrated versions of device 20, where each pixel of a display is a micromachined device 20 and where the display becomes a colored contoured or field map of any two or three dimensional quantity of interest from topology maps to brain function.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

For example, reflector 1 described above has been described as a cavity reflector with an internal reflective surface 32. However, it is expressly contemplated that device 20 may be made as a solid optically transmissive or clear body using total internal reflection (TIR) as the optical mechanism for light control. Such a TIR device 20 including an LED package could then be provided with an external optical reflective coating or not.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An apparatus having a common aperture with an axis normal to a plane in which the aperture lies and usable with an optical fiber having a predetermined acceptance angle comprising:

a plurality of light emitting diodes (LED) of similar or differing wavelengths;

a corresponding plurality of separate reflectors for collecting light radiated from the plurality of LEDs and forming a corresponding plurality of beams directed along a corresponding optical axis of each of the reflectors, each separate reflector defining a separate first space from other ones of the plurality of reflectors, each one of the plurality of LEDs being disposed in the separately defined first space of each corresponding one of the plurality of separate reflectors so that substantially all of the light emitted by the LED is included within the corresponding reflector; and a single combining chamber defining a separate and single second space from the plurality of reflectors and for combining the light of the plurality of beams into a composite beam across the common aperture with most of the light in the composite beam lying within the predetermined acceptance angle of the optical fiber measured from the axis of the common aperture, where the plurality of reflectors and the separate combining chamber have substantially continuous reflective surfaces smoothly extending from the plurality of LEDs to the common aperture where the plurality of reflectors and the combining chamber are each open cavities and are characterized by a high aspect ratio of length to width of such a magnitude that subsequently providing a reflecting internal surface for the plurality of reflectors and the combining chamber when assembled is impractical, where each reflector is comprised of a plurality of separate first optical reflector cavity surfaces, and where the combining chamber is collectively comprised of a plurality of separate second optical cavity surfaces, each separate second optical cavity surface extending from a corresponding one of the plurality of the first optical reflector cavity surface of the corresponding reflectors, each first optical reflector cavity surface and corresponding second optical cavity being comprised in turn of at least two separate longitudinally split portions to allow ease of access to each of the first optical reflector interior cavity surfaces and each of the second optical interior cavity surfaces for providing a reflective surface thereon.

2. An apparatus having a common aperture with an axis normal to a plane in which the aperture lies for use with an optical fiber having a predetermined acceptance angle comprising:

a plurality of light emitting diodes (LED) of similar or differing wavelengths;

a corresponding plurality of separate nearly cylindrical reflectors for collecting light radiated from the plurality of LEDs and forming a corresponding plurality of beams directed along a corresponding optical axis of each of the reflectors and symmetrically inclined about an predetermined axis of a common aperture, each separate reflector defining a separate first space from other ones of the plurality of reflectors, each one of the plurality of LEDs being disposed in the separately defined first space of each corresponding one of the plurality of separate reflectors so that substantially all of the light emitted by the LED is included within the corresponding reflector: and a single combining chamber having the common aperture and defining a separate and single second space from the plurality of reflectors and for combining the light of the plurality of beams into a single composite beam directed to the center of the common aperture with most of the light in the composite beam lying within the predetermined acceptance angle measured from the axis of the common aperture, where the plurality of reflectors and the separate combining chamber have substantially continuous reflective surfaces smoothly extending from the plurality of LEDs to the common aperture where the plurality of reflectors and the combining chamber are each characterized by a high aspect ratio of length to width of such a magnitude that subsequently providing a reflecting internal surface for the plurality of reflectors and the combining chamber when assembled is impractical, where each reflector is comprised of a plurality of separate longitudinally split first reflector cavities, and where the combining chamber is comprised of a plurality of separate longitudinally split second reflector cavities, each split second optical cavity surface extending from a corresponding one of the plurality of the split first optical reflector cavity surfaces of the corresponding reflectors, the longitudinally split reflector cavities and split combining chamber cavity allowing ease of access to the cavity surfaces for providing a reflective coating thereon.

* * * * *